US008348745B2

(12) United States Patent
Kim

(10) Patent No.: US 8,348,745 B2
(45) Date of Patent: Jan. 8, 2013

(54) GAMING SYSTEM AND A METHOD OF GAMING INCLUDING ADDING OR DELETING PREDETERMINED SYMBOL FROM THE SECOND SYMBOL STORE

(75) Inventor: Hyong Joo Kim, Meadowbank (AU)

(73) Assignee: Aristocrat Technologies Australia Pty Limited, North Ryde NSW (AU)

( * ) Notice: Subject to any disclaimer, the term of this patent is extended or adjusted under 35 U.S.C. 154(b) by 513 days.

(21) Appl. No.: 12/276,850

(22) Filed: Nov. 24, 2008

(65) Prior Publication Data

US 2009/0258694 A1 Oct. 15, 2009

(30) Foreign Application Priority Data

Nov. 23, 2007 (AU) ................................ 2007906575

(51) Int. Cl.
*A63F 9/24* (2006.01)
*A63F 13/00* (2006.01)
*G06F 17/00* (2006.01)
*G06F 19/00* (2006.01)

(52) U.S. Cl. ............................................ 463/20; 463/43

(58) Field of Classification Search .................... 463/20, 463/43
See application file for complete search history.

(56) References Cited

U.S. PATENT DOCUMENTS

| | | | | |
|---|---|---|---|---|
| 5,833,537 | A * | 11/1998 | Barrie | 463/21 |
| 2002/0036617 | A1 | 3/2002 | Pryor | |
| 2002/0037764 | A1 | 3/2002 | Anderson et al. | |
| 2003/0087694 | A1 | 5/2003 | Storch | |
| 2003/0222402 | A1 | 12/2003 | Olive | |
| 2004/0142738 | A1 | 7/2004 | Anderson et al. | |
| 2004/0204229 | A1 * | 10/2004 | Walker et al. | 463/20 |
| 2005/0010738 | A1 | 1/2005 | Stockdale et al. | |
| 2005/0119043 | A1 | 6/2005 | Berman et al. | |
| 2005/0282620 | A1 | 12/2005 | Marks et al. | |
| 2005/0288094 | A1 | 12/2005 | Marks et al. | |
| 2006/0068872 | A1 | 3/2006 | Walker et al. | |
| 2006/0252482 | A1 | 11/2006 | Walker et al. | |
| 2006/0252487 | A1 | 11/2006 | Anderson et al. | |
| 2006/0252492 | A1 | 11/2006 | Anderson et al. | |
| 2007/0060297 | A1 * | 3/2007 | Hein et al. | 463/20 |
| 2007/0117607 | A1 | 5/2007 | Olive | |
| 2009/0082087 | A1 * | 3/2009 | Pacey et al. | 463/20 |

FOREIGN PATENT DOCUMENTS

| | | |
|---|---|---|
| EP | 1501056 | 1/2005 |
| FR | 2808358 | 11/2001 |
| GB | 2057738 | 4/1981 |
| GB | 2101380 | 1/1983 |
| GB | 2106293 | 4/1983 |

* cited by examiner

*Primary Examiner* — William M. Brewster
(74) *Attorney, Agent, or Firm* — Hanley, Flight & Zimmerman, LLC

(57) ABSTRACT

Certain example embodiments relate to a gaming system which includes a symbol selector which is arranged to select a plurality of symbols from an available set of symbols. The set of symbols may include one or more predetermined symbols. The predetermined symbols form a predetermined symbol arrangement, such as a pattern or word. When a predetermined symbol is selected it is placed in a symbol store. When the predetermined symbol arrangement is completed, by selection of all of the predetermined symbols, then a prize may be won.

26 Claims, 9 Drawing Sheets

GAMING SYSTEM AND A METHOD OF GAMING INCLUDING ADDING OR DELETING PREDETERMINED SYMBOL FROM THE SECOND SYMBOL STORE

CROSS-REFERENCE TO RELATED APPLICATIONS

The present application claims the benefit of priority to Australian Provisional Patent Application No. 2007906575, filed on Nov. 23, 2007, entitled "A GAMING SYSTEM AND A METHOD OF GAMING", which is herein incorporated by reference in its entirety.

FIELD OF THE INVENTION

The present invention relates to a gaming system and to a method of gaming.

BACKGROUND OF THE INVENTION

It is known to provide a gaming system which comprises a game controller arranged to control the random display of several symbols from a set of symbols and to determine a game outcome such as a game win, based on the displayed symbols. Such gaming systems may commonly be implemented as a stepper machine provided with reels, with each reel carrying several symbols of the set, or a video machine wherein selected symbols are displayed on virtual reels on a graphical display device. "Win" or other outcomes can occur based on symbols appearing on one or more horizontal lines, diagonal lines, or in any other predetermined way.

It is known to provide games where a predetermined subset of the set of symbols may form a predetermined arrangement, such as a word or name, for example. Examples are games such as ZORRO™ or MRWOO™, where the predetermined symbols are letters and the predetermined arrangement is an arrangement of letters (in these examples spelling names such as "Zorro" and "Mr Woo"). The selection of the predetermined arrangement of symbols in the display may result in a particular game outcome, such as a game win, or generation of a feature game, or any other outcome.

Whilst gaming systems provide users with enjoyment, a need exists for alternative gaming systems in order to increase player enjoyment.

SUMMARY OF THE INVENTION

In accordance with a first aspect, the present invention provides a gaming system, including a symbol selector arranged to select a plurality of symbols from a set of symbols;

a symbol store arranged to store one or more of a set of predetermined symbols, which form a predetermined symbol arrangement, and an outcome generator arranged to determine whether one or more of the selected symbols are predetermined symbols and, if so, to execute an addition step to add the predetermined symbol(s) to the symbol store, and being arranged to determine a game outcome based on the symbol store.

The predetermined symbols may be any symbols that form a predetermined symbol arrangement. For example, they may be letters and the predetermined symbol arrangement may be a word or a name. The symbols may alternatively be numbers and the predetermined symbol arrangement may be a particular number. The predetermined symbols may be letters and numbers and the predetermined symbol arrangement may be a combination of letters and numbers. Predetermined symbols may be any other type of symbol, including graphical characters such as pictures, representations of cards, animals, people or any object.

In an embodiment, when addition of predetermined symbols to the symbol store results in the predetermined symbol arrangement, then the outcome generator is arranged to generate a game outcome, such as a win, for example. The win may result in a prize. The game outcome may result in a jackpot. It may result in the generation of a further game such as a feature game. It may result in any outcome in accordance with the game rules.

In an embodiment, in predetermined circumstances the addition step may result in deletion of a predetermined symbol from the symbol store. In an embodiment, the predetermined circumstance includes when a predetermined symbol, which is already in the store, is also selected by the symbol selector. The predetermined symbol is deleted from the symbol store. In an embodiment, the set of predetermined symbols are arranged in predetermined positions within the symbol arrangement. In this embodiment, deletion of an already stored symbol is executed when the selected predetermined symbol is the same as the stored symbol and is also in the same position in the arrangement as the already stored symbol.

In an embodiment, a display is provided for displaying the selected symbols. In an embodiment, selected predetermined symbols appearing anywhere in the display may be selected for addition to the symbol store. In one embodiment, the display may be arranged to display the selected symbols in a line and row format, including a plurality of lines and a plurality of rows. In this embodiment, symbols appearing anywhere in the display may be selected for addition to the symbol store or, alternatively, predetermined symbols appearing only on a particular line or lines or row or rows may be selected for the symbol store. In an embodiment, the display may represent a plurality of reels of the type provided by known gaming machines, either mechanical reels, implemented by a stepper motor mechanism or virtual reels which may be implemented by video or other display technology.

In an embodiment, the gaming system further includes a symbol store display, arranged to display the symbols that are in the symbol store.

In an embodiment, the outcome generator may further be arranged to determine the outcome of a base game based on the selected symbols appearing in the display. This may be in addition to determining an outcome of a game based on the symbols appearing in the symbol store display.

In accordance with a second aspect, the present invention provides a method of gaming, including the steps of:

selecting a plurality of symbols from a set of symbols;

storing in a symbol store one or more of a set of predetermined symbols which form a predetermined symbol arrangement;

determining whether one or more of the selected symbols are predetermined symbols and, if so, adding the symbol(s) to the symbol store, and determining a game outcome based on the symbol store.

In accordance with a third aspect, the present invention provides a computer programme, providing instructions for controlling a computer to implement a system in accordance with the first aspect of the invention.

In accordance with a fourth aspect, the present invention provides a computer readable medium providing a computer programme in accordance with the third aspect.

In accordance with a fifth aspect, the present invention provides a data signal, including a computer programme in accordance with the third aspect of the invention.

BRIEF DESCRIPTION OF THE DRAWINGS

Features and advantages of certain embodiments of the present invention will become apparent from the following description of embodiments thereof, by way of example only, with reference to the accompanying drawings, in which.

Figure 1:
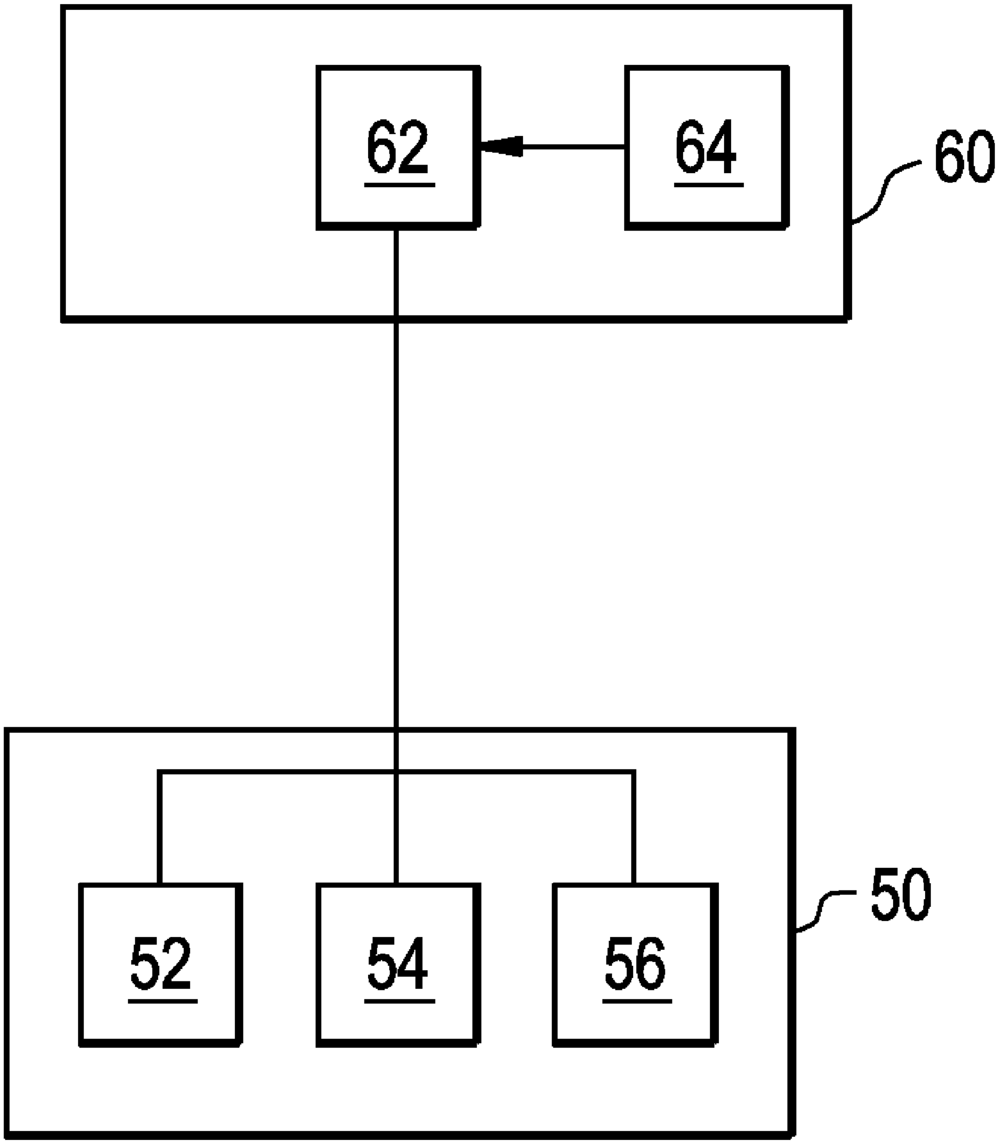
FIG. 1 is a schematic block diagram of core components of a gaming system in accordance with an embodiment of the present invention.

The foregoing summary, as well as the following detailed description of certain embodiments of the present invention, will be better understood when read in conjunction with the appended drawings. For the purpose of illustrating the invention, certain embodiments are shown in the drawings. It should be understood, however, that the present invention is not limited to the arrangements and instrumentality shown in the attached drawings.

DETAILED DESCRIPTION OF EMBODIMENTS

Referring to the drawings, there are shown example embodiments of gaming systems which are arranged to implement a game in which a plurality of symbols are selected from a set of symbols in order to determine a base game outcome. In these embodiments, the gaming system also includes a symbol store arranged to store a set of predetermined symbols. The predetermined symbols form a predetermined symbol arrangement. In the example embodiments disclosed in the following description, the predetermined symbols are letters and the predetermined symbol arrangement is a word or name. The invention is not limited to the predetermined symbol arrangement being a word or name or the symbols being letters, however. In other embodiments, any symbols and any predetermined symbol arrangement may be utilised.

An outcome generator is arranged to determine whether one or more of the selected symbols are predetermined symbols and, if so, to execute an addition step to add the predetermined symbols to the symbol store. A game outcome is based on the symbol store. For example if the addition step results in the predetermined symbol arrangement, then the game outcome may be a "win" result. A prize may be given for the win. This may be a jackpot prize. Alternatively, the game outcome could be the gaming system playing a feature game. Any other outcome that the game rules allow may be implemented.

The gaming system can take a number of different forms. In a first form, a stand alone gaming machine is provided wherein all or most components for implementing the game are present in a player operable gaming machine.

In a second form, a distributed architecture is provided wherein some of the components for implementing the game are present in a player operable gaming machine and some of the components for implementing the game are located remotely relative to the gaming machine. For example, a "thick client" architecture may be used wherein part of the game is executed on a player operable gaming machine and part of the game is executed remotely, such as by a gaming server; or a "thin client" architecture may be used wherein most of the game is executed remotely such as by a gaming server and a player operable gaming machine is used only to display audible and/or visible gaming information to the player and receive gaming inputs from the player.

However, it will be understood that other arrangements are envisaged. For example, an architecture may be provided wherein a gaming machine is networked to a gaming server and the respective functions of the gaming machine and the gaming server are selectively modifiable. For example, the gaming system may operate in stand alone gaming machine mode, "thick client" mode or "thin client" mode depending on the game being played, operating conditions, and so on. Other variations will be apparent to persons skilled in the art.

Irrespective of the form, the gaming system includes several core components. At the broadest level, the core components are a player interface 50 and a game controller 60 as illustrated in FIG. 1. The player interface is arranged to enable manual interaction between a player and the gaming system and for this purpose includes the input/output components for the player to enter instructions and play the game.

Components of the player interface may vary from embodiment to embodiment but will typically include a credit mechanism 52 to enable a player to input credits and receive payouts, one or more displays 54 and a game play mechanism 56 that enables a player to input game play instructions.

The game controller 60 is in data communication with the player interface and typically includes a processor 62 that processes the game play instructions in accordance with game play rules and outputs game play outcomes to the display. Typically, the game play instructions are stored as program code in a memory 64 but can also be hardwired. Herein the term "processor" is used to refer generically to any device that can process game play instructions in accordance with game play rules and may include: a microprocessor, microcontroller, programmable logic device or other computational device, a general purpose computer (e.g. a PC) or a server.

Figure 2:
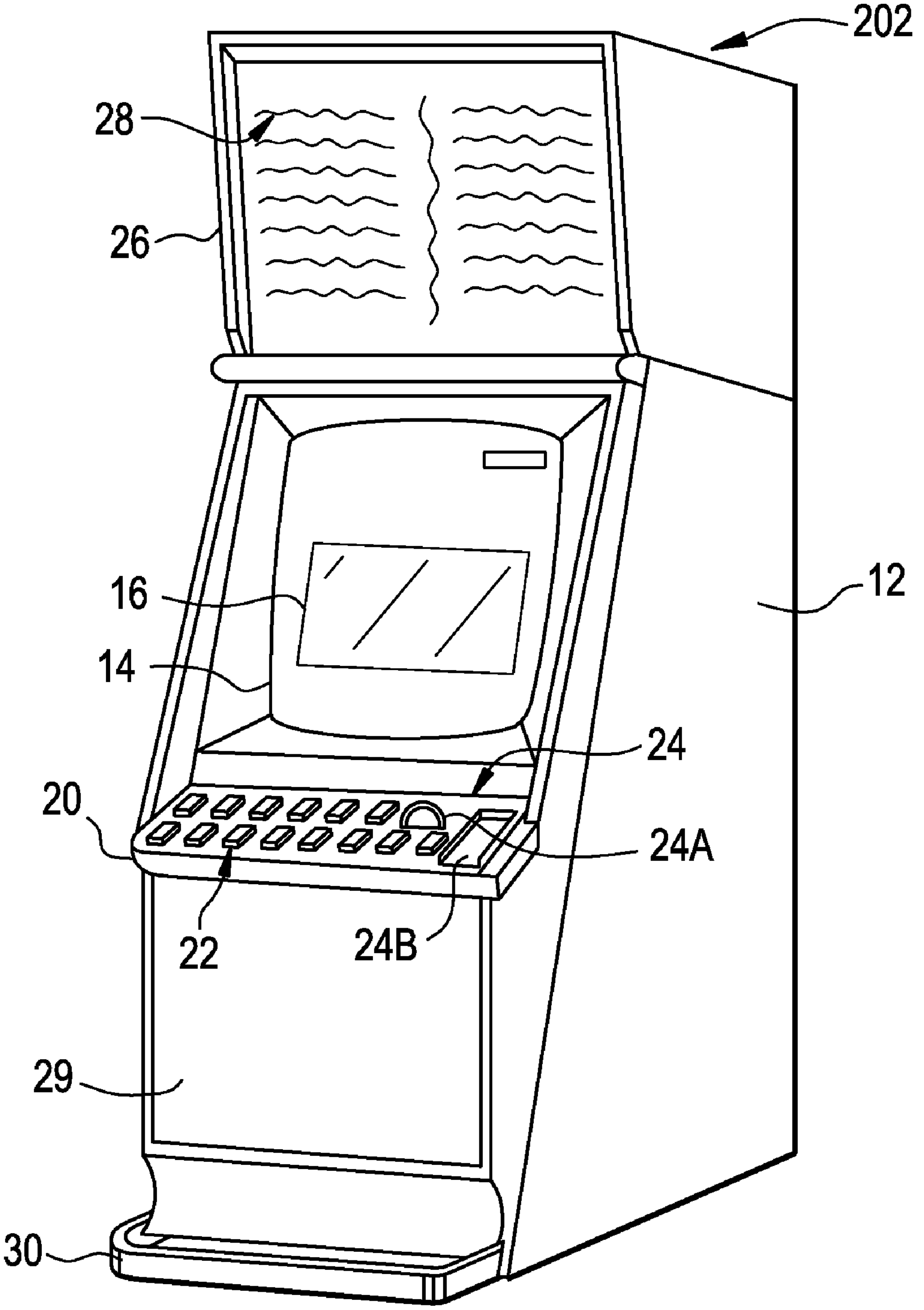
FIG. 2 is a diagrammatic representation of a gaming system in accordance with an embodiment of the present invention with the gaming system implemented in the form of a stand alone gaming machine.

A gaming system in the form of a stand alone gaming machine 10 is illustrated in FIG. 2. The gaming machine 10 includes a console 12 having a display 14 on which is displayed representations of a game 16 that can be played by a player. A mid-trim 20 of the gaming machine 10 houses a bank of buttons 22 for enabling a player to interact with the gaming machine, in particular during gameplay. The mid-trim 20 also houses a credit input mechanism 24 which in this example includes a coin input chute 24A and a bill collector 24B. Other credit input mechanisms may also be employed, for example, a card reader for reading a smart card, debit card or credit card. A reading device may also be provided for the purpose of reading a player tracking device, for example as part of a loyalty program. The player tracking device may be in the form of a card, flash drive or any other portable storage medium capable of being read by the reading device.

A top box 26 may carry artwork 28, including for example pay tables and details of bonus awards and other information or images relating to the game. Further artwork and/or information may be provided on a front panel 29 of the console 12. A coin tray 30 is mounted beneath the front panel 29 for dispensing cash payouts from the gaming machine 10.

The display 14 shown in FIG. 2 is in the form of a video display unit, particularly a cathode ray tube screen device. Alternatively, the display 14 may be a liquid crystal display, plasma screen, any other suitable video display unit, or the visible portion of an electromechanical device. The top box 26 may also include a display, for example a video display unit, which may be of the same type as the display 14, or of a different type.

Figure 3:
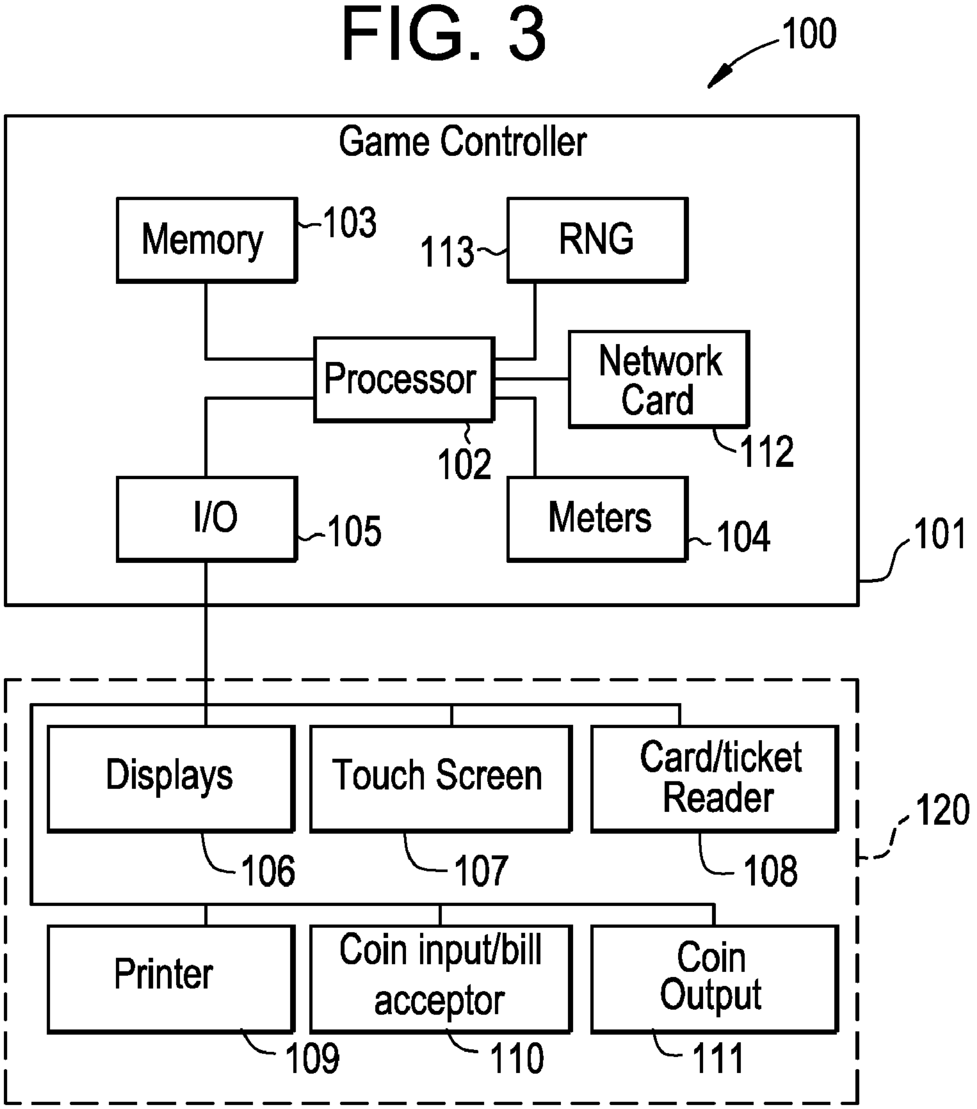
FIG. 3 is a schematic block diagram of operative components of the gaming machine shown in FIG. 2.

FIG. 3 shows a block diagram of operative components of a typical gaming machine which may be the same as or different to the gaming machine of FIG. 2.

The gaming machine 100 includes a game controller 101 having a processor 102. Instructions and data to control operation of the processor 102 are stored in a memory 103, which is in data communication with the processor 102. Typically, the gaming machine 100 will include both volatile and non-volatile memory and more than one of each type of memory, with such memories being collectively represented by the memory 103.

The gaming machine has hardware meters 104 for purposes including ensuring regulatory compliance and monitoring player credit, an input/output (I/O) interface 105 for communicating with peripheral devices of the gaming machine 100. The input/output interface 105 and/or the peripheral devices may be intelligent devices with their own memory for storing associated instructions and data for use with the input/output interface or the peripheral devices. A random number generator module 113 generates random numbers for use by the processor 102. Persons skilled in the art will appreciate that the reference to random numbers includes pseudo-random numbers.

In the example shown in FIG. 3, a player interface 120 includes peripheral devices that communicate with the game controller 101 include one or more displays 106, a touch screen 107, a card and/or ticket reader 108, a printer 109, a bill acceptor and/or coin input mechanism 110 and a coin output mechanism 111. Additional hardware may be included as part of the gaming machine 100, or hardware may be omitted based on the specific implementation.

In addition, the gaming machine 100 may include a communications interface, for example a network card 112. The network card may, for example, send status information, accounting information or other information to a central controller, server or database and receive data or commands from the central controller, server or database.

Figure 4:
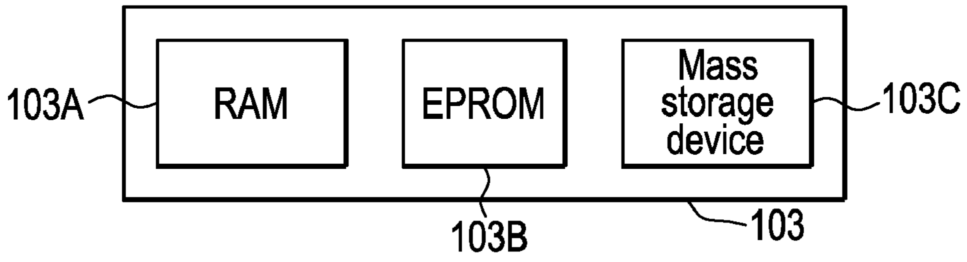
FIG. 4 is a schematic block diagram of components of a memory of the gaming machine shown in FIG. 2.

FIG. 4 shows a block diagram of the main components of an exemplary memory 103. The memory 103 includes RAM 103A, EPROM 103B and a mass storage device 103C. The RAM 103A typically temporarily holds program files for execution by the processor 102 and related data. The EPROM 103B may be a boot ROM device and/or may contain some system or game related code. The mass storage device 103C is typically used to store game programs, the integrity of which may be verified and/or authenticated by the processor 102 using protected code from the EPROM 103B or elsewhere.

It is also possible for the operative components of the gaming machine 100 to be distributed, for example input/output devices 106,107,108,109,110,111 to be provided remotely from the game controller 101.

Figure 5:
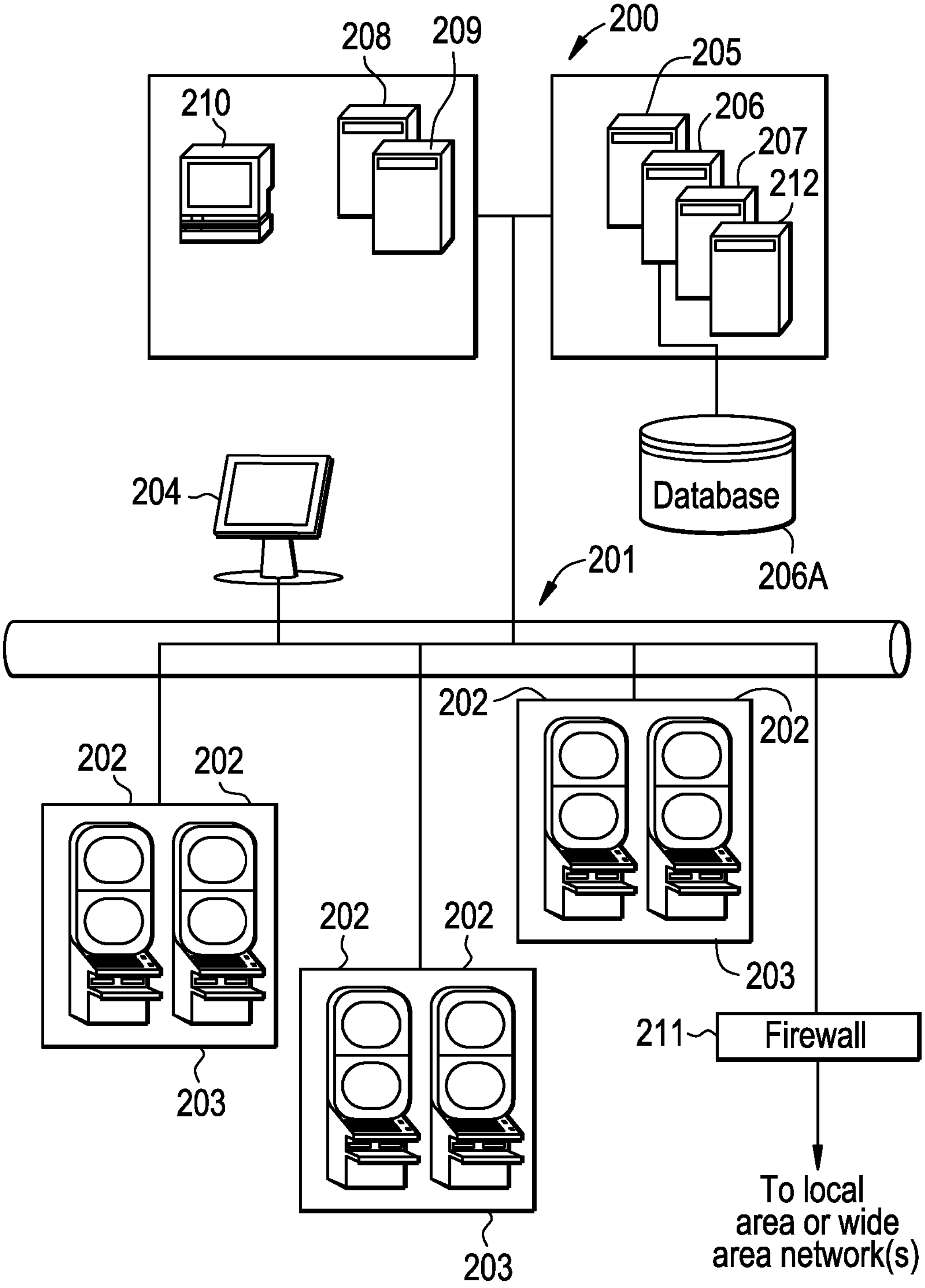
FIG. 5 is a schematic diagram of a gaming system in accordance with an alternative embodiment of the present invention with the gaming system implemented over a network.

FIG. 5 shows a gaming system 200 in accordance with an alternative embodiment. The gaming system 200 includes a network 201, which for example may be an Ethernet network. Gaming machines 202, shown arranged in three banks 203 of two gaming machines 202 in FIG. 5, are connected to the network 201. The gaming machines 202 provide a player operable interface and may be the same as the gaming machines 10, 100 shown in FIGS. 2 and 3, or may have simplified functionality depending on the requirements for implementing game play. While banks 203 of two gaming machines are illustrated in FIG. 5, banks of one, three or more gaming machines are also envisaged.

One or more displays 204 may also be connected to the network 201. The displays 204 may, for example, be associated with one or more banks 203 of gaming machines. The displays 204 may be used to display representations associated with game play on the gaming machines 202, and/or used to display other representations, for example promotional or informational material.

In a thick client embodiment, game server 205 implements part of the game played by a player using a gaming machine 202 and the gaming machine 202 implements part of the game. With this embodiment, as both the game server and the gaming device implement part of the game, they collectively provide a game controller. A database management server 206 may manage storage of game programs and associated data for downloading or access by the gaming devices 202 in a database 206A. Typically, if the gaming system enables players to participate in a Jackpot game, a Jackpot server 207 will be provided to monitor and carry out the Jackpot game.

In a thin client embodiment, game server 205 implements most or all of the game played by a player using a gaming machine 202 and the gaming machine 202 essentially provides only the player interface. With this embodiment, the game server 205 provides the game controller. The gaming machine will receive player instructions, pass these to the game server which will process them and return game play outcomes to the gaming machine for display. In a thin client embodiment, the gaming machines could be computer terminals, e.g. PCs running software that provides a player interface operable using standard computer input and output components.

Servers are also typically provided to assist in the administration of the gaming network 200, including for example a gaming floor management server 208, and a licensing server 209 to monitor the use of licenses relating to particular games. An administrator terminal 210 is provided to allow an administrator to run the network 201 and the devices connected to the network.

The gaming network 200 may communicate with other gaming systems, other local networks, for example a corporate network, and/or a wide area network such as the Internet, for example through a firewall 211.

Persons skilled in the art will appreciate that in accordance with known techniques, functionality at the server side of the network may be distributed over a plurality of different computers. For example, elements may be run as a single "engine" on one server or a separate server may be provided. For example, the game server 205 could run a random generator engine. Alternatively, a separate random number generator server could be provided. Further, persons skilled in the art will appreciate that a plurality of games servers could be provided to run different games or a single game server may run a plurality of different games depending upon the terminals.

Figure 6:
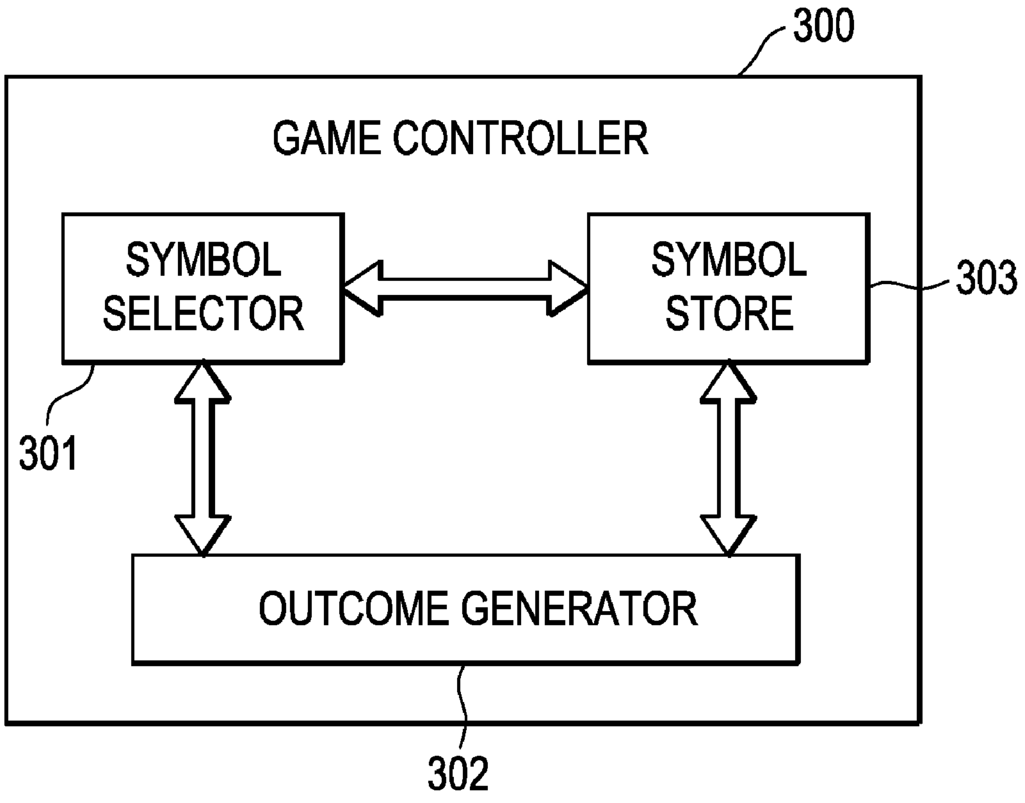
FIG. 6 is a schematic diagram of functional components of a gaming system in accordance with an embodiment of the present invention.

Referring to FIG. 6, the functionality of an embodiment of the present invention may be implemented by a game controller 300 having the functional components illustrated. In these embodiments, the functional components are implemented utilizing a processor and memory (such as processor 102 and memory 103 in FIG. 3, or processor 62 and memory 64 in FIG. 1, or the game server 205 of FIG. 5) and associated programming. Other implementations are envisaged. For example, the functional blocks of FIG. 6 may be implemented in hardware or as separate units, or a combination of hardware and software as separate units. Any practical implementation of these functional units may be employed.

Referring to FIG. 6, the game controller 300 includes a symbol selector 301 which is arranged to select a plurality of symbols from a set of symbols. In this embodiment, an outcome generator determines a base game outcome based on the symbols selected by the symbol selector 301. In the normal course of a game, these symbols are displayed on the display (54 of FIG. 1, 16 of FIG. 2, 106 of FIGS. 3 and 204 of FIG. 5). In this embodiment, the selected symbols are displayed as a plurality of virtual reels on a video display, having lines and rows. Alternatively, the display may include a stepper motor and physical reels.

In this embodiment, the outcome of the base game depends on the selected symbols appearing in the display and may include a win outcome, loss outcome, trigger outcome, or feature outcome or any other outcome. Outcomes may be determined on the basis of symbols appearing in the one or more horizontal lines, diagonal lines, or any other predetermined combination.

In this embodiment, the game controller 300 also includes a symbol store 303. The outcome generator 302 is arranged to determine which of the symbols selected (by the symbol selector 301) are predetermined symbols that form part of a predetermined symbol arrangement. If there are no predetermined symbols in the symbol selection, then the outcome generator takes no further action (other than to determine the outcome of the base game). If predetermined symbols are present in the selection, however, then the outcome generator will determine whether the symbols are to be added to the symbol store 303 and, if so, will execute an addition step, adding the symbols to the symbol store 303. When the symbol store contains all the predetermined symbols of the arrangement, the outcome generator may determine a game outcome based on the symbols in the symbol store. The game outcome may be a win, or feature outcome, or jackpot outcome, in addition to the base game outcome.

An example embodiment of a game will now be described with reference to FIGS. 7 to 10. This example is based on what are generally known as "letter collection games". In known letter collection games, the predetermined symbols are letters and the predetermined symbol arrangement is a word or name. This example is ZORRO™ which is played as a slot reel game where symbols are selected and displayed in lines and rows. If the symbols "ZORRO" are selected and appear in the display, then a game outcome in the form of a win or a feature game or other outcome is provided to the user. In order for such a game outcome to be achieved, the arrangement (ZORRO) must appear in the display during a single game.

Figure 7:
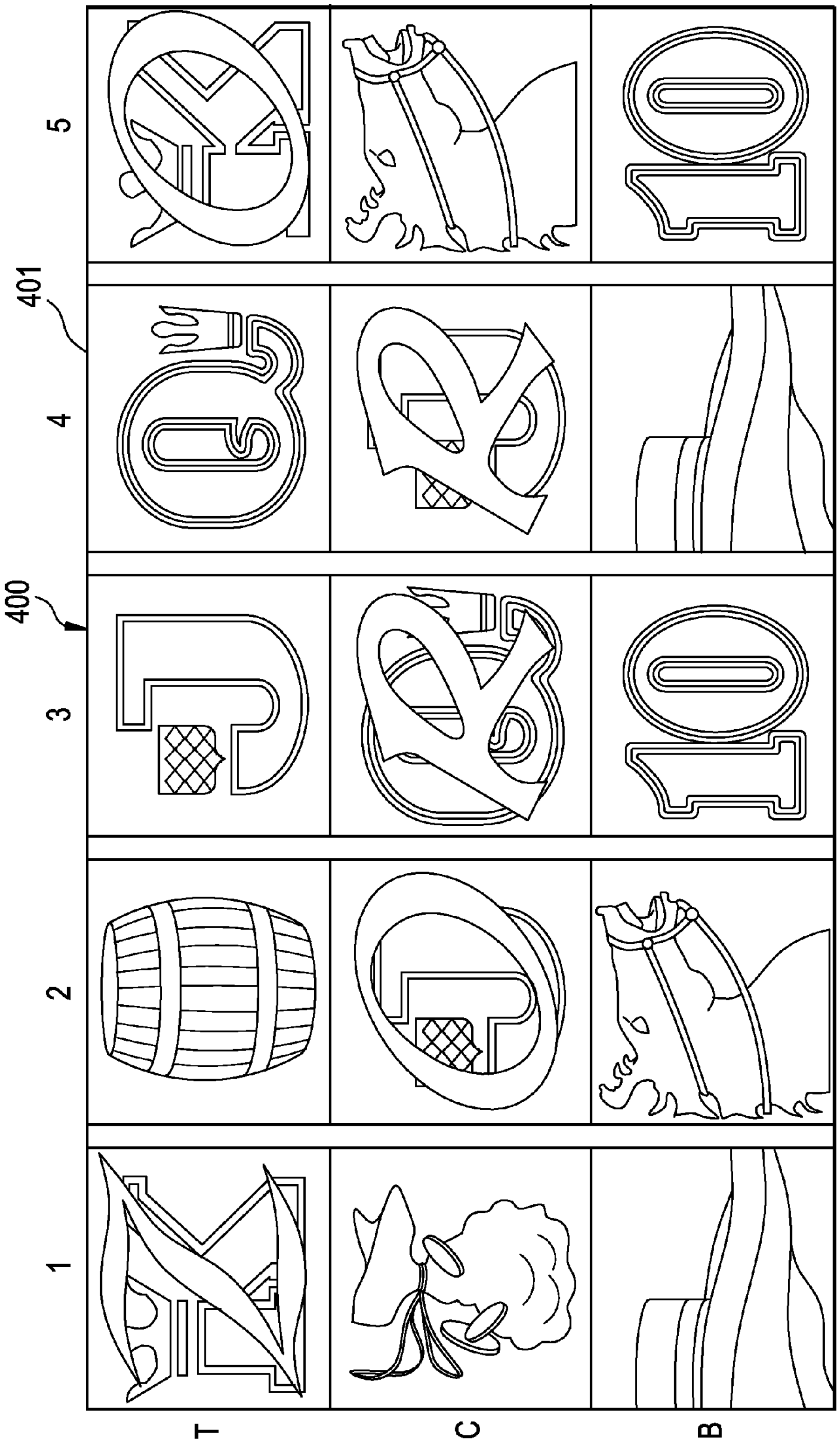
FIG. 7 is a representation of a display of a gaming system in accordance with an embodiment of the present invention.

Referring to FIG. 7, a display 400 in accordance with an embodiment of the present invention is shown. In this embodiment, the gaming machine display 400 has five reels (numbered "1" to "5"). A display window 401 shows three windows high when the reels have stopped/the symbols have been selected. The reels are designated bottom ("B"), centre ("C") and top ("T"). This is a typical reel-type display for a gaming machine. It will be appreciated that in other embodiments the number of reel positions may be more or less than in display 400. Also the number of reels may be more or less than in the display 400.

The reels may be virtual reels, generated as a video display from the selected symbols, actual mechanical reels carrying the symbols and driven by a stepper motor, or any other reel arrangement or emulation. In the case of actual physical reels, the game controller drives a stepper motor to randomly select the symbols appearing in the display 400.

A base game outcome is determined by the outcome generator based on combinations of symbols selected and appearing in the display 400. The symbols may be any symbols. As will be appreciated, many different types of symbols are used in gaming systems. A set of symbols may include standard symbols and function symbols. For example, standard symbols may resemble fruit such as apples, pears and bananas with a win outcome being determined when a predetermined number of the same fruit appear on a display in the same line, scattered, and so on. The function associated with a function symbol may be a "wild" function wherein display of the function symbol is treated during consideration of the game outcome as any of the standard symbols. Other functions may include scatter functions, multiplier functions, repeat win functions, jackpot functions and feature commencement functions.

In the embodiment shown in FIG. 7, as well as the base game symbols (here symbols of cards are shown as well as symbols of animals, hats, money and barrels), the predetermined symbols are provided which form the predetermined symbol arrangement "ZORRO". In the illustration in FIG. 7, "Z" appears in reel 1, "O" in reel 2, "R" in reel 3, "R" in reel 4, and "O" in reel 5. The arrangement "ZORRO", therefore appears in the window and the game outcome generated by the ZORRO function is achieved. As discussed above, this may be a win, a jackpot, a feature game, or any other outcome.

Figure 8:
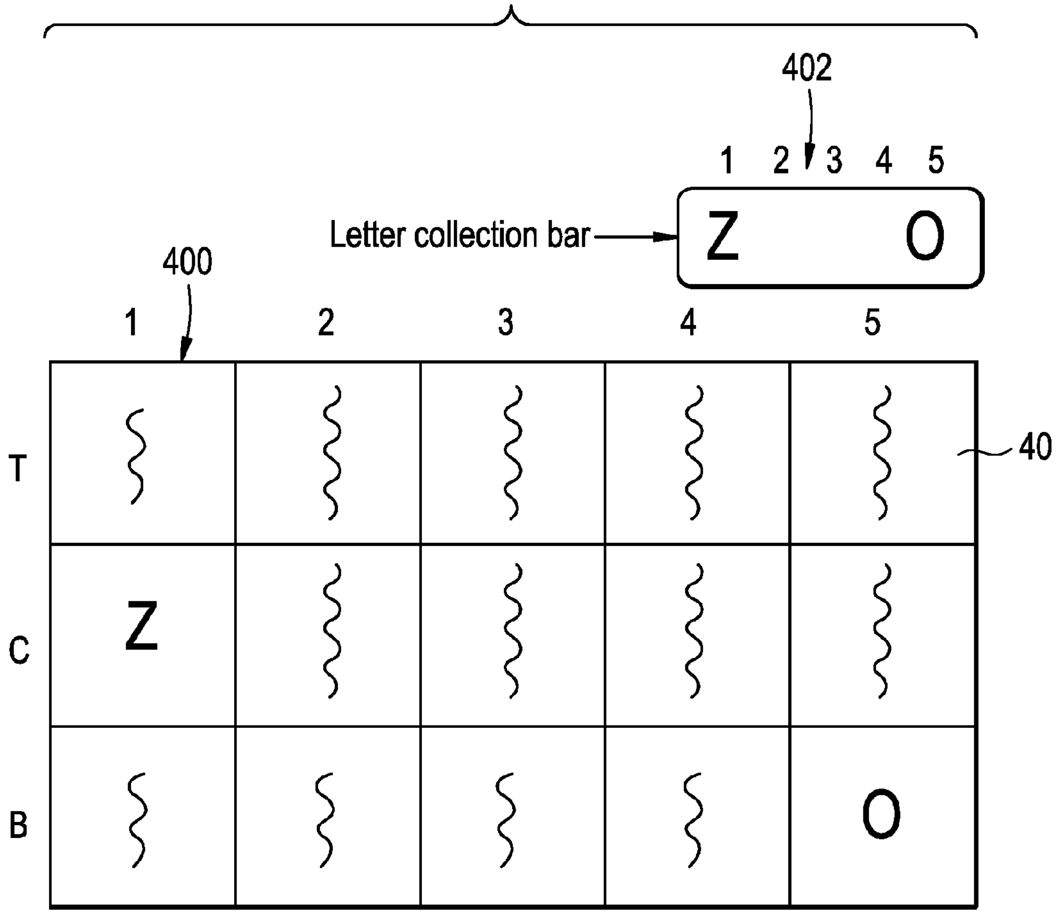
FIG. 8 is a further representation of a display in accordance with an embodiment of the present invention.

In prior art gaming systems which play letter games like ZORRO, if all the letters of the predetermined arrangement do not appear in the display at the end of a game, then the outcome is not achieved. The player may commence a new game, but they start again from the beginning. In this embodiment of the invention, however, the symbol store is provided to "save" predetermined selected symbols that appear in the display. These saved symbols are then available for use in subsequent game plays. Referring to FIG. 8, as well as the display 400, the gaming system of this embodiment also has a symbol store display 402. In this embodiment the symbol store display 402 appears over the reel display 400. It may appear elsewhere in the display panel, or on another display panel.

In this embodiment, when a predetermined symbol (one of the ZORRO letters) appears in the display 400, it is added to the symbol store 303 and appears in the symbol store display 402. When all of the characters are added to the symbol store display 402 so that the term "ZORRO" is complete, then the win or other outcome for the ZORRO feature is generated.

In the display 400 in the example of FIG. 8, the symbol selector has selected a number of symbols to appear in the display window 401. These include the base game symbols (not shown) and also, in this example, two of the letters that make up the ZORRO arrangement. A "Z" appears in reel 1 and an "O" appears in reel 5.

In this example, the outcome generator 302 determines that "Z" and "O" of the predetermined symbols have been selected in reel 1 and reel 5 respectively. It executes an addition step, adding the "Z" and "O" to the symbol store. The symbol store display 402 then shows the added letters Z and O in respective positions "1" and "5" in symbol store display 402. In this example the ZORRO outcome has not been achieved. Nevertheless, a Z and O have been added to the symbol store 303. In subsequent games, further additions may be made to the symbol store 303, until the ZORRO feature is achieved.

Another feature of this embodiment, however, is that if a symbol which already appears at the same position within the symbol store display 402 is also selected on the display 400 (i.e. the reel position corresponds with the symbol position in the symbol store display) then the addition of the symbol appearing on the reel to the symbol store results in deletion of the symbol from the symbol store. For example, if a Z already exists at position 1 in the symbol store, and a Z appears on reel 1, then the Z is cancelled from the symbol store.

Figure 9A:
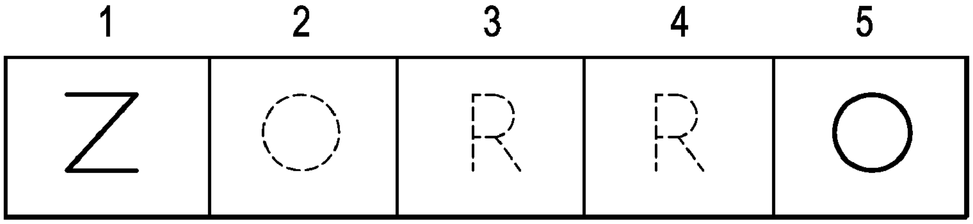
FIGS. 9 A, B and C are representations of a symbol store display of a gaming system in accordance with an embodiment of the present invention.
Figure 9B:
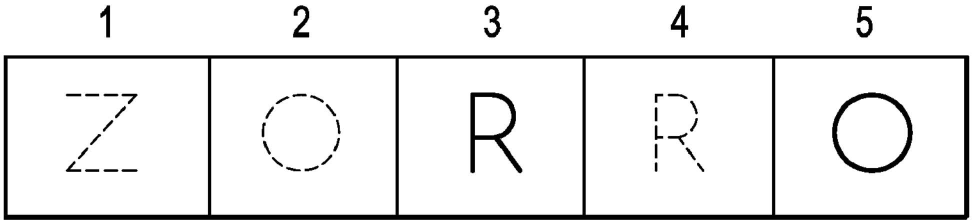
Figure 9C:
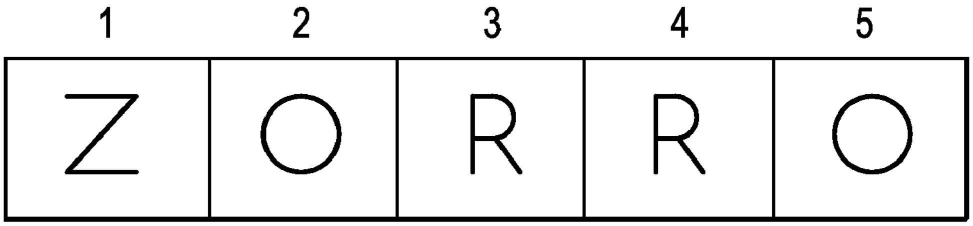

As an example of how a game may be played to achieve the ZORRO feature, reference will now be made to FIG. 9. FIGS. 9A, B, C show examples of the symbol store display 402 following sequential plays of the base game. FIG. 9A is the position with the symbol store following the selection that was achieved in FIG. 8 by the first game play.

In the next game the letter "Z" appears in reel 1 and "R" appears in reel 3. The symbol store display 402 is updated and results in the display of FIG. 9B. The letter "Z" in position 1 has been cancelled (the letters that are in ghost outline are not displayed and are merely shown for illustration). The "R" has been added to position 3 and the "O" remains at position 5.

In the next game, a letter "Z" has been selected in reel 1, a letter "O" in reel 2 and the letter "R" in reel 4. The symbol store display 402 is then updated to appear as in FIG. 9C. It can be seen that the name "ZORRO" is completed. The outcome generator 302 determines the appropriate outcome for completion of "ZORRO", which could be a win, a jackpot, generation of a further feature game, or any other outcome according to the game rules.

In this example embodiment, after the ZORRO outcome has been generated, the symbol store 303 is reset so that it contains none of the predetermined symbols.

Figure 10:
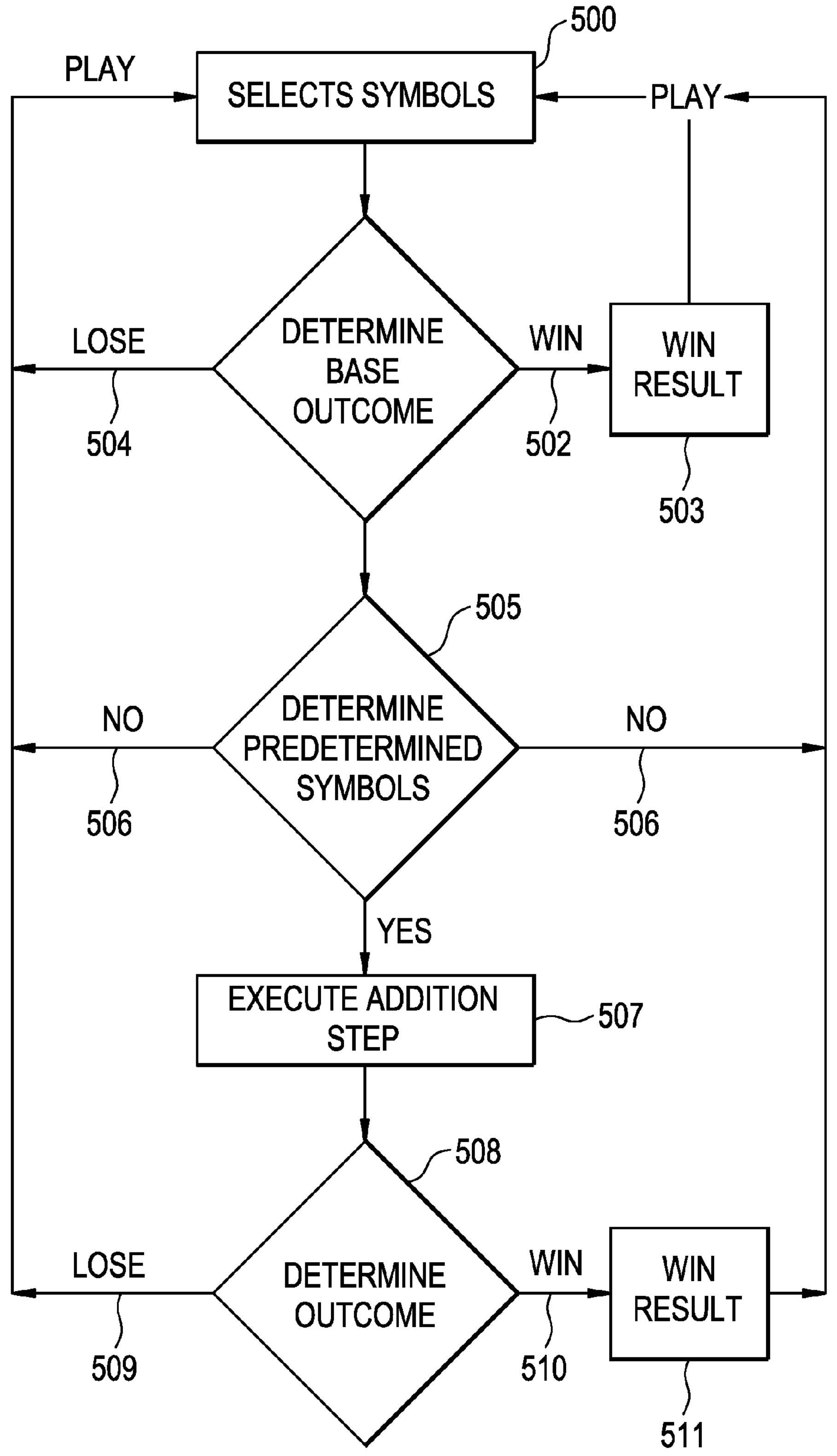
FIG. 10 is a flow diagram illustrating operation of a gaming system in accordance with an embodiment of the present invention.

Referring to FIG. 10, a flow diagram illustrating operation of this embodiment is shown. This embodiment plays a base game (combinations of lines and/or rows of base symbols to produce a base game outcome) and also a letter game (such as ZORRO). At step 500 the symbol selector selects symbols for display in the display 400 (FIG. 7). At step 501 the outcome generator 302 determines the base game outcome. If the outcome is a win 502, a win result 503 is generated. The win result may be any win result depending upon the base game outcome. For example, 5 "queen" symbols in a line may produce a win payout.

If the base game outcome is a loss 504, no win result 503 result will be generated.

In addition to the base game, and regardless of the base game outcome in this embodiment, the outcome generator at step 505 also determines whether any predetermined symbols (e.g. when the game ZORRO is being played, any of the symbols Z, O, R, R, O) have been selected. If no 506, game play returns to step 500 and the player has a choice of whether or not to play again. If "yes", the addition step is executed at step 507 so that the predetermined symbols are added to the symbol store 303 and appear on the symbol store display 402.

At step 508, the outcome generator 302 makes a determination as to whether the predetermined symbol arrangement has been achieved in the symbol store 303. If not, play returns to the beginning (step 509) if yes (step 510) then a win result 511 may be generated based on the achievement of the predetermined symbol combination. The player may then choose to start the game again.

In the above embodiment, the position of the predetermined symbols in the reel display corresponds to the position of the symbols placed in the symbol store display. The invention is not limited to this. In other embodiments, there may be no limitation on where in the reel display the symbols appear for them to be placed in the correct order on the symbol store display. In other embodiments, the position of the predetermined symbol in the reel display may be even more important. For example, in one embodiment only predetermined symbols which appear on the centre row C are added to the symbol store 303. Other position dependent embodiments may be implemented.

In the above example, the predetermined arrangement is a combination of letters which results in a name. Other embodiments may use other names (e.g. MRWOO). The predetermined arrangement need not be a name. It could be a word or other collection of letters e.g. "ABCDE".

In an embodiment the arrangement need not be an ordered arrangement. It could be 5 letters that appear in the symbol store in any order, not in any predetermined order. For example, as long as the letters ABCDE are collected, it does not matter which order they appear in.

Embodiments are not limited to the symbols being letters. The predetermined symbols may be numbers or any other symbol forming any predetermined symbol arrangement e.g. 12345.

As discussed above, the game display is not limited to 5 reels by 3 lines. There could be any number of reels or lines. The display need not even be in reel format, it may be in any format.

In the above embodiment, the gaming system implements a base game as well as the game associated with the symbol store. In an alternative embodiment, the gaming system may implement only the game associated with the symbol store and there may be no base game.

In a further embodiment, the symbol store may be associated with or networked to a plurality of gaming machines. Each machine may contribute predetermined symbols to the connected symbol store. The winning machine may be the machine that contributes the final symbols to the symbol store that achieves a predetermined arrangement. This may be implemented by a "bank" of machines associated with a single overhead display for the symbol store. It may alternatively be implemented by networked machines which each have a display which shows the status of the networked symbol store.

In the above embodiment, to achieve the game outcome, all the predetermined symbols must be added to the symbol store. In an alternative embodiment, the final addition step need not necessarily be taken. In this alternative embodiment, if some of the predetermined symbols are already in the store, and the remaining symbols appear in the main display, then the outcome generator may determine a successful outcome without taking the step of physically adding the symbols in the display to the symbol store display.

In the above embodiment, when a predetermined symbol which appears in the reel display is the same as a symbol already stored, the addition step results in the deletion of the stored symbol. This makes it more difficult for a player to win this feature and therefore enables higher value prizes to be offered. In other embodiments, this "deletion" feature may not be implemented, and if a selected predetermined symbol which is already in the symbol store appears again in the display, the predetermined symbol merely remains unchanged in the symbol store.

In the above embodiment, there is only one predetermined arrangement of symbols. In other embodiments, there may be a plurality of predetermined arrangements of predetermined symbols. Each predetermined arrangement may give a different prize. There may be plurality of symbol stores and a plurality of associated symbol store displays, one for each predetermined symbol combination.

An example embodiment where there may be a plurality of predetermined arrangements of predetermined symbols will now be described.

In this embodiment there are five predetermined arrangements, being five words, made up by letter symbols. The words are:

HAT
MAT
CAT
CHAT
MATCH

The letters available for selection are A, C, H, M, T. As with the previously described embodiment, these letters may be selected during a base game which includes the symbols A, C, H, M, T. Alternatively, the symbols may be selected as part of a game associated with the symbol store and there is no base game.

In this embodiment, each of the five available words has a different prize value associated with it. Alternatively, one or more of the words may have the same prize value. For example, MAT, HAT and CAT may have the same prize value as they all constitute three letters only and CHAT and MATCH may have different prize values (four and five letters, respectively). CHAT and MATCH may have higher prize values, for example.

Prize values may depend on the number/chance of each of the letters A, C, H, M, T being selected. Prize values may alternatively or also depend upon amount gambled by the player.

One option for playing this embodiment is to collect the letters and put them into different words. For example, the first A may go into HAT, the second A selected may go into MAT, etc. until five A's have been collected (assuming that no prize is won in the meantime). Subsequent A's may be added in order to delete an A, as with the above-described embodiment. Alternatively, subsequent A's may have no effect.

In an alternative embodiment, the letters are collected and rearranged at each new selection to make the nearest completed word.

For example, if A and T have been collected, then an H is selected, then the player wins a prize (HAT). Similarly he would win a prize if C or M was selected (CAT or MAT). In the embodiment where letters are collected and put into different words each word must be built separately and the letters are not collected and rearranged each time there is a new selection to make the nearest completed word.

Another example of the latter embodiment, is if C, A and M are already collected, then the player wins a prize if T is collected (CAT or MAT). If H is the next collected item then the player has MACH and a prize is won when the T is collected.

In the first variation discussed above, where the letters are collected and put into different words, it may be convenient to have a plurality of symbol stores, one for each word to be built.

In the latter embodiment, where the letters are collected and then a judgment is made on the next letter selection for any one of the words to be made up, only a single symbol store may be necessary, and the outcome generator will determine whether one of the five words has been made on the next selection.

As with the previous embodiment, any symbols may be used in the game where there are a plurality of predetermined arrangements available for prizes. The symbols are not limited to letters, may include numbers, a mixture of letter and numbers, or any other symbols.

The embodiment where there are a plurality of predetermined arrangements available may be implemented on a single gaming machine, but may also be suitable for implementation with linked machines and a central symbol store for which the linked machines select symbols.

In the claims which follow and in the preceding description of certain embodiments of the invention, except where the context indicates otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive. Several embodiments are described above with reference to the drawings. These drawings illustrate certain details of specific embodiments that implement the systems and methods and programs of the present invention. However, describing the invention with drawings should not be construed as imposing on the invention any limitations associated with features shown in the drawings. The present invention contemplates methods, systems and program products on any electronic device and/or machine-readable media suitable for accomplishing its operations. Certain embodiments of the present invention may be implemented using an existing computer processor and/or by a special purpose computer processor incorporated for this or another purpose or by a hardwired system, for example.

Embodiments within the scope of the present invention include program products comprising machine-readable media for carrying or having machine-executable instructions or data structures stored thereon. Such machine-readable media can be any available media that can be accessed by a general purpose or special purpose computer or other machine with a processor. By way of example, such machine-readable media may comprise RAM, ROM, PROM, EPROM, EEPROM, Flash, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such a connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

Method steps associated with certain embodiments may be implemented in one embodiment by a program product including machine-executable instructions, such as program code, for example in the form of program modules executed by machines in networked environments. Generally, program modules include routines, programs, objects, components, data structures, etc., that perform particular tasks or implement particular abstract data types. Machine-executable instructions, associated data structures, and program modules represent examples of program code for executing steps of the methods disclosed herein. The particular sequence of such executable instructions or associated data structures represents examples of corresponding acts for implementing the functions described in such steps.

The invention claimed is:

1. A gaming system, comprising:

a symbol selector arranged to select a plurality of symbols from a set of symbols to thereby generate a game outcome, the set of symbols comprising a subset of predetermined symbols;

a first symbol store arranged to store one or more of the subset of predetermined symbols, the first symbol store being associated with a first prize;

a second symbol store arranged to store one or more of the subset of predetermined symbols, the second symbol store being associated with a second prize that is different from the first prize; and an outcome generator arranged to examine the first symbol store to determine whether it contains a first predetermined symbol of the subset of predetermined symbols and if so examining the second symbol store to determine whether it contains the first predetermined symbol of the subset of predetermined symbols, wherein, if the second symbol store does not contain the first predetermined symbol of the subset of predetermined symbols, adding the first predetermined symbol to the second symbol store, and wherein, if the second symbol store does contain the first predetermined symbol of the subset of predetermined symbols, deleting the first predetermined symbol from the second symbol store, the outcome generator further arranged to determine an outcome based on the first symbol store and the second symbol store.

2. A gaming system in accordance with claim 1, wherein, in predetermined circumstances, the addition step results in deletion of a symbol from the symbol store.

3. A gaming system in accordance with claim 2, wherein the predetermined circumstances are that the selected predetermined symbol is already stored in the symbol store.

4. A gaming system in accordance with claim 2, wherein the predetermined circumstances are that the selected predetermined symbol is already stored in the symbol store and the selected predetermined symbol is at the game position within the predetermined symbol arrangement as the already stored symbol.

5. A gaming system in accordance with claim 1, further comprising a display arranged to display the selected symbols wherein predetermined symbols appearing anywhere in the display may be added to the symbol store.

6. A gaming system in accordance with claim 5, wherein the display is arranged to display the selected symbols in a line and row format, including a plurality of lines and a plurality of rows.

7. A gaming system in accordance with claim 6, wherein only predetermined symbols appearing on a predetermined line may be added to the symbol store.

8. A gaming system in accordance with claim 6, wherein only predetermined symbols appearing on a predetermined row may be added to the symbol store.

9. A gaming system in accordance with claim 1, including a symbol store display, arranged to display the symbols stored in the symbol store.

10. A gaming system in accordance with claim 1, wherein the outcome generator is further arranged to determine a base game outcome based on the symbols selected from the set of symbols.

11. A gaming system in accordance with claim 1, wherein the set of predetermined symbols are letters and the predetermined symbol arrangement is an arrangement of letters.

12. A gaming system in accordance with claim 1, wherein there are a plurality of predetermined symbol arrangements, and the outcome generator is arranged to determine whether one or more of the selected symbols are predetermined symbols for one or more of the predetermined symbol arrangements.

13. A gaming system in accordance with claim 12, further comprising a plurality of symbol stores, one for each predetermined symbol arrangement.

14. A method of gaming, comprising:

selecting a plurality of symbols from a set of symbols to thereby generate a game outcome, the set of symbols comprising a subset of predetermined symbols;

storing in a first symbol store one or more of the subset of predetermined symbols, the first symbol store being associated with a first prize;

storing in a second symbol store one or more of the subset of predetermined symbols, the second symbol store being associated with a second prize that is different from the first prize;

examining the first symbol store to determine whether it contains a first predetermined symbol of the subset of predetermined symbols and if so examining the second symbol store to determine whether it contains the first predetermined symbol of the subset of predetermined symbols, wherein, if the second symbol store does not contain the first predetermined symbol of the subset of predetermined symbols, adding the first predetermined symbol to the second symbol store, and wherein, if the second symbol store does contain the first predetermined symbol of the subset of predetermined symbols, deleting the first predetermined symbol from the second symbol store, determining an outcome based on the first symbol store and the second symbol store.

15. A method in accordance with claim 14, wherein the step of adding the symbol(s) to the symbol store comprises deleting a symbol from the symbol store.

16. A method in accordance with claim 15, wherein a symbol is deleted from the symbol store when a predetermined symbol is selected that is the same as the symbol in the symbol store.

17. A method in accordance with claim 15, wherein a symbol is deleted from the symbol store when a selected predetermined symbol is the same as the symbol in the symbol store and is in the same position within the symbol arrangement.

18. A method in accordance with claim 14, comprising the further step of displaying the selected symbols, wherein predetermined symbols appearing anywhere in the display may be added to the symbol store.

19. A method in accordance with claim 18, wherein the step of displaying the selected symbols comprises displaying the selected symbols in line and row format, including a plurality of lines and a plurality of rows.

20. A method in accordance with claim 19, wherein the step of selecting a predetermined symbol for the symbol store comprises the step of selecting predetermined symbols appearing on a predetermined line of the display.

21. A method in accordance with claim 19, wherein the step of selecting a predetermined symbol for the symbol store, comprises the step of selecting a predetermined symbol appearing on a predetermined row of the display.

22. A method in accordance with claim 14, comprising the further step of displaying the symbols in the symbol store.

23. A method in accordance with claim 14, comprising the further step of determining a base game outcome based on the symbols selected from the set of symbols.

24. A method in accordance with claim 14, wherein the set of predetermined symbols are letters and the predetermined symbol arrangement is an arrangement of letters.

25. A method in accordance with claim 14, wherein there are a plurality of predetermined symbol arrangements, and the step of determining whether one or more of the selected symbols are predetermined symbols, comprises determining whether they are predetermined symbols for one or more of the plurality of the predetermined symbol arrangements.

26. A computer non-transitory readable medium including a computer program providing instructions for controlling a computer to implement a gaming system, the gaming system comprising:

a symbol selector arranged to select a plurality of symbols from a set of symbols to thereby generate a game outcome, the set of symbols comprising a subset of predetermined symbols;

a first symbol store arranged to store one or more of the subset of predetermined symbols, the first symbol store being associated with a first prize;

a second symbol store arranged to store one or more of the subset of predetermined symbols, the second symbol store being associated with a second prize that is different from the first prize; and an outcome generator arranged to examine the first symbol store to determine whether it contains a first predetermined symbol of the subset of predetermined symbols and if so examining the second symbol store to determine whether it contains the first predetermined symbol of the subset of predetermined symbols, wherein, if the second symbol store does not contain the first predetermined symbol of the subset of predetermined symbols, adding the first predetermined symbol to the second symbol store, and wherein, if the second symbol store does contain the first predetermined symbol of the subset of predetermined symbols, deleting the first predetermined symbol from the second symbol store, the outcome generator further arranged to determine an outcome based on the first symbol store and the second symbol store.

* * * * *

UNITED STATES PATENT AND TRADEMARK OFFICE

CERTIFICATE OF CORRECTION

PATENT NO. : 8,348,745 B2
APPLICATION NO. : 12/276850
DATED : January 8, 2013
INVENTOR(S) : Hyong Joo Kim It is certified that error appears in the above-identified patent and that said Letters Patent is hereby corrected as shown below:

In column 16, line 1 (claim 26), please delete “A computer non-transitory” and add “A non-transitory computer”.

Signed and Sealed this
Ninth Day of April, 2013

Teresa Stanek Rea
*Acting Director of the United States Patent and Trademark Office*